Dec. 22, 1964 H. D. HEWITT 3,162,479
AUTOMOBILE CONSTRUCTION FOR SAFELY DECELERATING
PASSENGERS UPON HIGH SPEED IMPACT
Filed Dec. 10, 1963 2 Sheets-Sheet 2

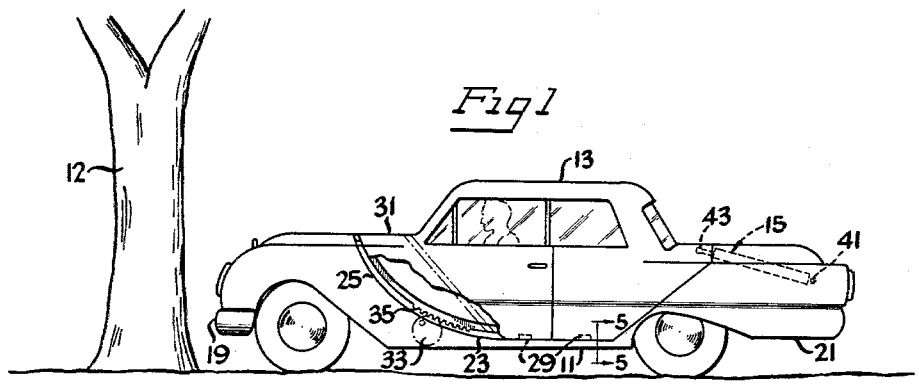
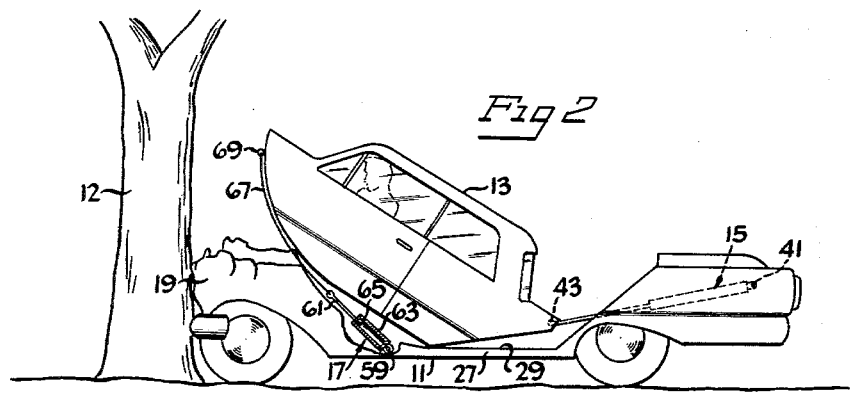
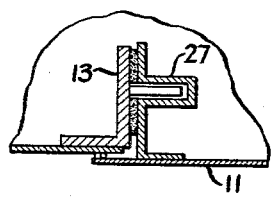

Inventor
Harlan D. Hewitt
By
Anderson, Luedeka, Fitch, Even & Tabin
Atty's

United States Patent Office 3,162,479
Patented Dec. 22, 1964

3,162,479
AUTOMOBILE CONSTRUCTION FOR SAFELY DE-
CELERATING PASSENGERS UPON HIGH SPEED
IMPACT
Harlan D. Hewitt, 1210 Astor St., Chicago, Ill.
Filed Dec. 10, 1963, Ser. No. 329,541
10 Claims. (Cl. 296—35)

This invention relates to the safety construction of vehicles. More particularly, it relates to a safety construction for vehicles which is particularly adapted to protect the vehicle passengers during high speed collisions or impacts.

This application is a continuation-in-part of my co-pending application Serial No. 182,892 filed March 27, 1962, and now abandoned.

With the advent of high speed vehicular transportation, the dangers involved to life and limb of passengers has drastically increased.

Manufacturers have, in recent years, developed certain safety features which are intended to reduce the dangers incident to high speed impacts in order to protect the vehicle passengers. Automotive manufacturers have developed padded dashboards, padded sun visors and seat belts which fasten about the passenger's waist and restrain forward movement of the passenger in the event of a front end collision.

Airplanes have also long been provided with safety belts to restrain passenger movement in the event of a severe impact.

These safety features have had, however, only limited effectiveness. For example, in automotive application at reduced speeds, the safety features have provided the necessary factor to prevent serious or fatal injury to the automobile passengers. However, at high speed impacts, these safety features have proved ineffective and passengers involved in such accidents have suffered serious consequences. These undesirable results exist by virtue of the fact that in a high speed impact or collision, the vehicle is almost instantaneously decelerated to zero velocity with the kinetic energy of the vehicle being absorbed by deformation of the vehicle front end components causing the passengers to be thrown forward at a velocity approximating the vehicle speed prior to impact. The kinetic energy of the passengers' bodies must be absorbed to decelerate them along with the vehicle after impact. At very high speeds, even padded dashboards and safety belts are ineffective to decelerate the passengers at a reasonable rate and to safely absorb the shock of rapid deceleration.

Accordingly, it is the principal object of the present invention to provide an improved safety construction for vehicles which safely decelerates the passengers upon high speed impact or collision.

A further object of the invention is to provide a safety construction for vehicles which absorbs the kinetic energy of the bodies of the passengers upon high speed impact at a rate conducive to safe deceleration of the passengers.

Another object of the invention is to provide a safety construction for vehicles which allows the passenger compartment to move relative to the chassis of the vehicle to safely absorb the kinetic energy of the passengers' bodies upon high speed impact.

A further object of the invention is to provide a safety construction for vehicles which absorbs the kinetic energy of the passengers' bodies upon impact by providing controlled deceleration of the passenger compartment.

A still further object of the invention is to provide a safety construction for vehicles which absorbs the kinetic energy of the passengers' bodies upon high speed impact by providing controlled movement of the passenger compartment with respect to the vehicle chassis upon initial impact, and also during return movement after impact.

It is a still further object of the present invention to provide a safety construction for vehicles which improves the protection afforded passengers riding in the vehicle without changing the exterior appearance thereof.

Another object of the present invention is to provide a safety construction for vehicles adapted to be utilized in both automotive and air-borne vehicles as well as other transporting conveyances.

Other objects and advantages of the invention will become apparent with reference to the following description and the accompanying drawings.

In the drawings:

FIGURE 1 is an elevational view of the vehicle prior to impact with another object showing various of the features of the invention.

FIGURE 2 is an elevational view of the vehicle immediately after impact with another object showing portions of the vehicle in a displaced position.

FIGURE 5 is a fragmentary sectional view taken along the line 5—5 of FIGURE 1 showing various of the features of the invention.

Figure 3:
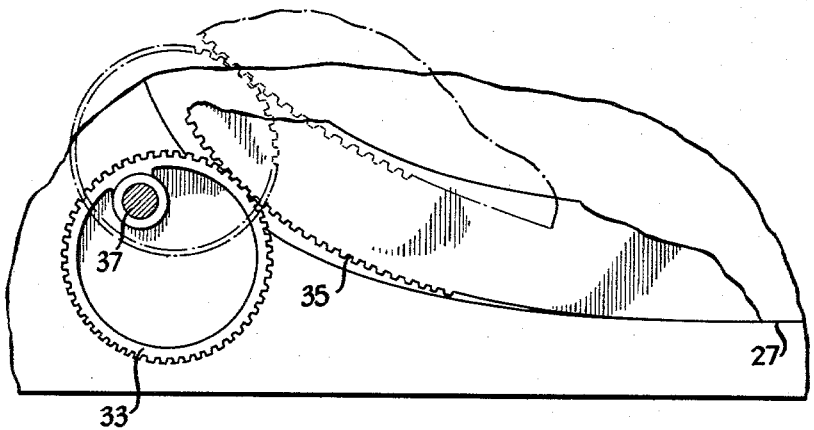
FIGURE 3 is an elevational view of a portion of the apparatus showing various features of the invention.

Very generally, the illustrated embodiment includes an automotive vehicle comprising a chassis 11, a passenger compartment 13 releasably secured to the chassis and two pairs of energy absorbing devices 15 and 17 connected between the passenger compartment and the chassis. When a high speed collison occurs, the passenger compartment breaks away from its fixed position on the chassis and is allowed to travel in the direction of movement of the vehicle prior to impact even though the velocity of the chassis has been almost instantaneously reduced to zero. The energy absorbing devices 15 and 17 then operate by virtue of the movement of the passenger compartment relative to the chassis to absorb the kinetic energy of the compartment and accomplish deceleration of the passengers within the compartment at a substantially decreased rate significantly reducing the forces to which the passengers are subjected as a result of the impact and in this manner preventing serious or fatal injuries.

The vehicle construction is particularly adapted to automotive applications and will be described with relation thereto although it has, of course, numerous other applications such as air-borne vehicles and other passenger transporting conveyances.

More specifically, and as shown in FIGURE 1, the chassis portion of the vehicle includes a front end 19 having a hood, engine, bumpers and other heavy elements of the car. The rear end 21 of the chassis portion includes the usual space for luggage, spare tires and tools, etc. Intermediate the front and rear ends of the chassis there is formed a cradle 23 having an upwardly curved front end 25 and a pair of tracks 27 running longitudinally of the chassis.

The passenger compartment 13 is firmly secured to the cradle 23 in the tracks 27 by securing elements 29 which are adapted to release the passenger compartment at high speed impacts as will be hereinafter more fully described. With the passenger compartment positioned within the cradle of the chassis, the vehicle appears to be of conventional construction. Ordinary bumps or collisions at speeds where seat belts or other safety features of conventional vehicles give adequate protection do not release the passenger compartment from its fixed position on the cradle. However, in the event of a collision at high speed where even the protection afforded by seat belts is insufficient, the securing elements 29 release the passenger compartment 13 allowing it to travel in the direction of movement of the vehicle prior to impact along the tracks 27 of the cradle 23. As best shown in FIGURE 5, the tracks 27 of the cradle 23 guide the passenger compartment 13 in its longitudinal movement thus preventing diversion of the passenger compartment in a lateral direction.

The operating elements of the vehicle such as the brakes, steering wheel and shift lever which require manipulation by the driver may be provided with a mechanical disconnect such as a pin and slot (not shown) which disengage upon movement of the passenger compartment relative to the chassis or may alternatively comprise a hydraulic system with appropriately placed servo mechanism operatively connected to the control elements in the passenger compartment by flexible hoses which allow movement of the compartment without loss of control over brake and steering functions. An example of a disconnectible steering mechanism is disclosed generally in the French patent to Martin, No. 705,020.

As shown in FIGURE 2, the cradle 23 is upwardly curved at its front end 25, and forward movement of the passenger compartment 13 causes the forward end 31 of the passenger compartment to be directed upwardly as the passenger compartment travels longitudinally along the tracks 27. The upwardly directed movement of the forward end 31 of the passenger compartment reduces the inertial force of the passenger compartment as work is expended in raising the compartment and passengers above the normally fixed position of the compartment on the chassis 11. To implement the upward movement of the passenger compartment by the cradle 23, there is provided an eccentric 33 geared to a suitable rack 35 attached to the forward end 31 of the passenger compartment 13. The eccentric 33 is mounted on a rotatable shaft 37 and upon forward movement of the passenger compartment, the engagement of the rack and eccentric causes the eccentric and shaft to rotate, thus further raising the forward end 31 of the passenger compartment.

As the passenger compartment is adapted to disconnect from the chassis upon high speed impact, the deceleration of the passengers and absorption of kinetic energy required by the passenger compartment and passengers can be absorbed in a controlled path of travel and at a significantly reduced deceleration rate. The maximum force imposed upon the passenger's body is, therefore, significantly reduced and the chances for survival substantially improve. Further, as the forward end 31 of the passenger compartment is caused to be directed upwardly as well as longitudinally forwardly, the passenger compartment is tipped in a relation such that the passenger seats (not shown) are tipped far back thus the pressures imposed by forward movement of the passengers is directed toward and partially absorbed by the seat cushions further reducing the chances of injury to the passengers.

Though the upward movement of the passenger compartment 13 does absorb or convert the kinetic energy of the forward movement of the passenger compartment into work in elevating the compartment, the amount of energy so transformed is insufficient adequately to decelerate the passenger compartment at a safe rate. Therefore, the two pairs of energy absorbing devices 15 and 17 are provided to absorb the remaining kinetic energy and reduce the velocity of the passenger compartment to zero.

Figure 4:
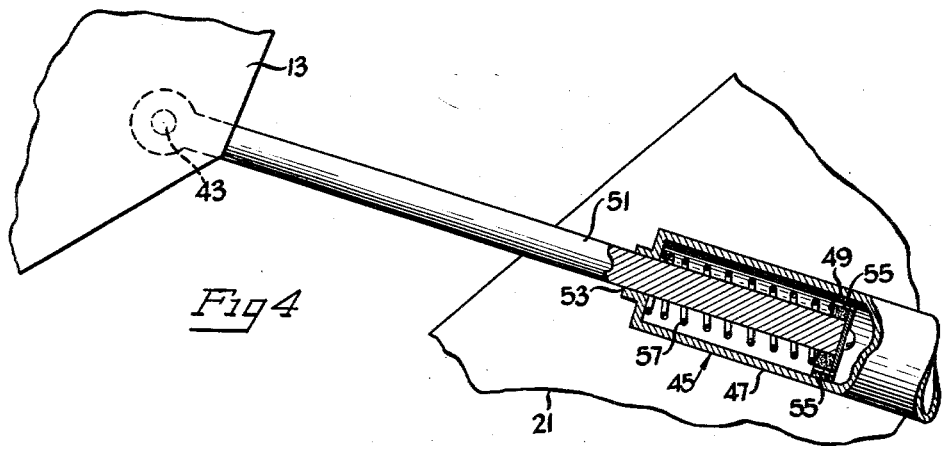
FIGURE 4 is a fragmentary view of a portion of the apparatus showing various other features of the invention.

The energy absorbing devices 15, shown in FIGURE 4, are hingedly connected to the chassis of the vehicle by pins 41 and to the passenger compartment by pins 43. The hinged connection allows the energy absorbing devices to pivot about the connection as the passenger compartment moves forwardly in order to prevent damage to the devices upon forward movement of the forward end 31 of the passenger compartment. These energy absorbing devices comprise a pneumatic absorbing unit 45 having a hollow cylinder 47 closed at both ends, a piston 49 positioned within the cylinder and slidable therein and an operating shaft 51 passing through the opposite end 53 of the cylinder and being connected to the piston 49. The piston 49, positioned at the end of the shaft 51, contains a plurality of orifices 55 extending therethrough parallel to the longitudinal axis of the shaft 51. The orifices are sized to allow restricted passage therethrough of the air providing communication between the space within the cylinder disposed on either side of the piston. With the passenger compartment 13 positioned in normal relation to the chassis 11, the piston 49 is located adjacent the end of the cylinder nearest the point of connection to the chassis. Upon high speed collision of the vehicle with another object such as the tree 12 and subsequent forward movement of the passenger compartment and passengers with respect to the chassis 11, the shaft 51 connected to the passenger compartment is also caused to move longitudinally in the direction of movement of the compartment. This movement causes the piston 49 to travel through the cylinder toward the end furthest from its connection to the chassis thus compressing the air enclosed between the piston and the closed end of the cylinder. As the air is compressed, it is caused to pass through the orifices 55 converting the kinetic energy of movement of the passenger compartment into heat thus decelerating the passenger compartment and passengers during the forward travel of the compartment.

At extremely high speed impacts, the forward travel of the passenger compartment and attendant energy dissipation achieved in the energy absorbing piston and cylinder arrangement would be insufficient to safely decelerate the passenger compartment and passengers in the length of travel available. Therefore, energy storing devices in the form of springs 57 are provided in the cylinder 47 between the end through which the shaft 51 is passed and the piston 49. Upon impact and forward movement of the passenger compartment and accompanying forward movement of the piston 49, the energy storing spring 57 is compressed between the end of the cylinder and the piston thus storing energy and further reducing the deceleration rate of the passenger compartment and passengers. As stated, the spring 57 is merely an energy storing device except for conversion of the energy to heat by friction in deformation of the spring. Therefore, the spring, upon reaching its compressed position, will immediately restore the energy so stored, to the piston 49. This causes the piston to move toward the secured end of the cylinder and by virtue of the connection to the passenger compartment 13 through the shaft 51, the passenger compartment and passengers also are moved in a direction opposite to the direction of travel of the vehicle prior to impact. Normally, this would impart rapid acceleration to the passenger compartment and passengers and might cause injury should the rate of acceleration be of sufficient magnitude. However, movement of the piston 51 in this direction causes compression of the air between the piston and fixed end of the cylinder and the stored energy is therefore converted to heat by virtue of the restricted passage of the air through the orifices 55. Further, travel in this direction by the passenger compartment and passengers places the entire inertial force of the passengers upon the seats of the passenger compartment thus further providing for energy absorption thereby reducing the rate of deceleration of the passengers and preventing serious injury.

Upon absorption of the energy stored by the spring 57, the velocity of the passenger compartment and passengers has been reduced to zero and the kinetic energy of the compartment and passengers has been safely converted to heat without undue forces being imparted to the passengers which would normally cause serious or fatal injuries.

The second pair of energy absorbing devices 17 are similar in construction to the devices 15 and are hingedly connected to the chassis as by pins 59 intermediate the curved cradle 23 at the forward end of the chassis and the rear end of the chassis. A shaft 61 similar to shaft 51 extends from a cylinder 63 similar to cylinder 47 within which is positioned a slidable piston 65 provided with orifices similar to the orifices 55 of the piston 49. Connection of the shaft 61 is accomplished through the use of stretchable extension cables 67 which are attached to the forward end of the passenger compartment 13 by lugs 69. As the passenger compartment moves forwardly and upwardly upon a high speed impact, the stretchable cables allow the front end to freely assume its raised position subsequent to impact without operation of the energy absorbing devices 17. After the passenger compartment 13 is caused to assume its upwardly tilting position by operation of the cradle 23 and the rotating eccentric 33, the cables have been stretched to their limit and become taut. Further movement of the passenger compartment forwardly and upwardly causes the cables to pull the shaft 61 in a direction to cause movement of the piston 65 within the cylinder 63 and to compress the air located between the end of the cylinder through which the shaft passes and the piston. Dissipation of energy again occurs by compression of the air within the cylinder and conversion of the energy to heat by restricted passage of the air through the orifices located in the piston. In this manner, further deceleration of the passenger compartment and reduction of the inertial effects of the high speed impact is accomplished.

The stretchable extension cables 67 restrain the upward movement of the front end of the passenger compartment to the extent that the passenger compartment is prevented from free upward movement and possible overturning due to excessive inertial forces. Additionally, as shown in FIGURE 2, the connection to the forward end of the passenger compartment with the second set of energy absorbing devices becomes operative after some travel of the passenger compartment has occurred, the energy absorbing function is carried out by energy absorbing units which are positioned closer to the point of impact of the front end of the auto and the other object. This reduces the effective lever arm length tending to rotate the automobile chassis about the fulcrum point of the contact of the vehicle with the object, thus improving the effective restraint provided by the weight of the chassis in restricting forward movement of the cylinder 63 so that the forward movement of the shaft 61 effectively moves the piston 61 within the cylinder.

As can be seen, a safety construction for vehicles has been provided which effectively reduces the forces imposed upon passengers due to extremely high deceleration rates incident to high speed collision with a relatively immovable object. The several elements of the safety construction are related to each other and to the vehicle design in order to give the passenger compartment a controlled and gradual deceleration to zero velocity thus substantially improving the safety factor for passengers riding within the vehicle.

Various of the features of the invention are set forth in the following claims.

What is claimed is:

1. In a safety construction for vehicles, the combination of a chassis with a longitudinal track between its front and rear, said track curving upwardly at its front, a passenger body adapted to fit into the contour of said track so that upon longitudinal movement of said body relative to said track the curve of the track will separate the front end of the body from the chassis and add a vertical component to the movement of the body, and shock cushioning elements connecting the chassis and the body so as to check the travel of the passenger body and absorb kinetic energy, whereby physical shock to passengers may be reduced by affording additional distance for their deceleration.

2. In a safety construction for vehicles, the combination of a chassis with a longitudinal track between its front and rear, said track curving upward at its front, a passenger body adapted to fit into the contour of said track so that upon longitudinal movement of said body relative to said track the curve of the track will separate the body from the chassis and add a vertical component to the movement of the body, a cable between the chassis and the leading portion of the body so as to restrain the body from turning over backwards, and shock cushioning elements connecting the chassis and the body so as to check the travel of the passenger body and absorb kinetic energy, whereby physical shock to passengers may be reduced by affording additional distance for their deceleration.

3. In a safety construction for vehicles, the combination of a chassis having a gently curved transverse recess between its front and rear portions adapted to accommodate a passenger compartment, a compartment curved at the front to fit closely in said recess and securely fastened therein against forces short of high speed crash conditions, said chassis having curved tracks for the passenger compartment front so that in the event of a major crash the body will be guided upward to reduce its forward component of motion, shock cushioning elements connecting the chassis and the body to dissipate energy released by the sudden change of motion in a crash, and connecting means between the body and the chassis to restrain the body from excessive travel.

4. In a safety construction for vehicles, the combination including a normally horizontally disposed horizontally elongated chassis having a front and a rear end, a horizontally disposed passenger compartment adapted to accommodate at least one passenger therein positioned on said chassis intermediate the front and rear ends thereof, means securing said compartment to said chassis adapted to release said compartment therefrom upon impact of said chassis with another object at a predetermined velocity allowing said compartment to move with respect to said chassis toward the front end thereof, means adjacent the front end of said chassis adapted to cause the forward portion of said passenger compartment to separate from said chassis and move vertically with respect thereto as said compartment continues its horizontal movement along said chassis, energy absorbing means connecting said passenger compartment to said chassis adapted to dissipate the kinetic energy of said compartment and reduce the velocity thereof to zero at a rate of deceleration substantially slower than the rate of deceleration of said chassis upon impact whereby the passengers within said compartment are protected from injury.

5. In a safety construction for vehicles, the combination including a normally horizontally disposed horizontally elongated chassis having a front and a rear end, a horizontally disposed passenger compartment adapted to accommodate at least one passenger therein positioned on said chassis intermediate said front and rear ends thereof, means securing said compartment to said chassis adapted to release said compartment therefrom upon impact of said chassis with another object at a predetermined velocity allowing said compartment to move with respect to said chassis toward the front end thereof, an arcuately curved cradle positioned adjacent the front end of said chassis adapted to cause the forward portion of said passenger compartment to separate from said chassis and move vertically with respect thereto as said compartment continues its horizontal movement along said chassis, energy absorbing means connecting said passenger compartment to said chassis adapted to dissipate the kinetic energy of said compartment and reduce the velocity thereof to zero at a rate of deceleration substantially slower than the rate of deceleration of said chassis upon impact whereby the passengers within said compartment are protected from injury.

6. In a safety construction for vehicles, the combination including a normally horizontally disposed horizontally elongated chassis having a front and a rear end, a horizontally disposed passenger compartment adapted to accommodate at least one passenger therein positioned on said chassis intermediate said front and rear ends thereof, means securing said compartment to said chassis adapted to release said compartment therefrom upon impact of said chassis with another object at a predetermined velocity allowing said compartment to move with respect to said chassis toward the front end thereof, means adjacent the front end of said chassis adapted to cause the forward portion of said passenger compartment to separate from said chassis and move vertically with respect thereto as said compartment continues its horizontal movement with respect to said chassis, said means including an arcuately curved cradle adapted to guide said passenger compartment vertically upwardly upon horizontal movement of such passenger compartment, said means further including a vertically disposed toothed eccentric rotatably mounted on said chassis and being in engagement with an upwardly curved toothed rack secured to the forward end of said passenger compartment, said eccentric and said rack being constructed and arranged so that generally horizontal forward movement of said passenger compartment causes said rack to rotate said eccentric to thereby lift said forward end of said passenger compartment, energy absorbing means connecting said passenger compartment to said chassis so as to dissipate the kinetic energy of said compartment and reduce the velocity thereof to zero at a rate of deceleration substantially slower than the rate of deceleration of said chassis upon impact whereby the passengers within said compartment are protected from injury.

7. In a safety construction for vehicles, the combination including a normally horizontally disposed horizontally elongated chassis having a front and a rear end, a horizontally disposed passenger compartment adapted to accommodate at least one passenger therein positioned on said chassis intermediate said front and rear ends thereof, means securing said compartment to said chassis adapted to release said compartment therefrom upon impact of said chassis with another object at a predetermined velocity allowing said compartment to move with respect to said chassis toward the front end thereof, means adjacent the front end of said chassis adapted to cause the forward portion of said passenger compartment to separate from said chassis and move vertically with respect thereto as said compartment continues its horizontal movement along said chassis, at least one horizontally disposed shock absorber including a hollow cylinder closed at each end connected to said chassis adjacent one end of said cylinder, a piston containing at least one orifice adapted to allow passage of air therethrough slidably positioned within said cylinder, and a piston rod connected to said passenger compartment whereby movement of said compartment along said chassis causes said piston to move toward one end of said chamber compressing the air contained therein and causing said air to pass through said orifice to convert the kinetic energy of the passenger compartment into heat thereby reducing the velocity of the passenger compartment to zero at a rate of deceleration which will not cause injury to the passengers contained therein.

8. In a safety construction for vehicles, the combination including a normally horizontally disposed horizontally elongated chassis having a front and rear end, a horizontally disposed passenger compartment adapted to accommodate at least one passenger therein positioned on said chassis intermediate said front and rear ends thereof, means securing said compartment to said chassis adapted to release said compartment therefrom upon impact of said chassis with another object at a predetermined velocity allowing said compartment to move with respect to said chassis toward the front end thereof, means adjacent the front end of said chassis adapted to cause the forward portion of said passenger compartment to separate from said chassis and move vertically with respect thereto as said compartment continues its horizontal movement along said chassis, energy storing means adapted to store a portion of the kinetic energy of the passenger compartment upon movement thereof in the direction of movement of the vehicle prior to impact, energy absorbing means connected between said passenger compartment and said chassis adapted to absorb that portion of the energy of said passenger compartment not stored by said energy storing means upon movement thereof with respect to said chassis in the direction of movement of said chassis prior to impact, said energy absorbing means further being adapted to absorb the kinetic energy of said compartment stored by said energy storing means upon movement of said compartment in a direction opposite to the movement of said chassis prior to impact with another object whereby the velocity of said compartment is reduced to zero at a rate of deceleration which will protect the passengers within said compartment from injury.

9. In a safety construction for vehicles, the combination including a normally horizontally disposed horizontally elongated chassis having a front and a rear end, a horizontally disposed passenger compartment adapted to accommodate at least one passenger therein positioned on said chassis intermediate said front and rear ends thereof, means securing said compartment to said chassis adapted to release said compartment therefrom upon impact of said chassis with another object at a predetermined velocity allowing said compartment to move with respect to said chassis toward the front end thereof, means adjacent the front end of said chassis adapted to cause the forward portion of said passenger compartment to separate from said chassis and move vertically with respect thereto as said compartment continues its horizontal movement along said chassis, shock cushioning means connecting said passenger compartment to said chassis adapted to dissipate the kinetic energy of said compartment and reduce the velocity thereof to zero at a rate of deceleration substantially slower than the rate of deceleration of said chassis upon impact whereby the passengers within said compartment are protected from injury, at least one stretchable cable connecting the front end of said compartment with the front end of said chassis providing for controlled upward movement thereof upon impact with another object preventing said compartment from tipping backward due to excessive upward movement of the front end thereof.

10. In a safety construction for vehicles, the combination including a normally horizontally disposed horizontally elongated chassis having a front and a rear end, a horizontally disposed passenger compartment adapted to accommodate at least one passenger therein positioned on said chassis intermediate said front and rear ends thereof, means securing said compartment to said chassis adapted to release said compartment therefrom upon impact of said chassis with another object at a predetermined velocity allowing said compartment to move with respect to said chassis toward the front end thereof, means adjacent the front end of said chassis adapted to cause the forward portion of said passenger compartment to separate from said chassis and move vertically with respect thereto as said compartment continues its horizontal movement along said chassis, a first pair of energy absorbing devices connected between the rear end of said chassis and said passenger compartment adapted to absorb a portion of the kinetic energy of said compartment upon movement thereof upon said chassis, at least one stretchable cable connecting the front end of said compartment with the front end of said chassis providing for controlled upward movement thereof upon impact with another object preventing said compartment from tipping backward due to excessive upward movement of the front end thereof, said cable being adapted to actuate a second energy absorbing means upon stretching to a predetermined length, said energy absorbing means further absorbing the kinetic energy of said passenger compartment at a location nearer the point of impact of said chassis with another object so as to more effectively utilize the weight of said chassis to counteract the forward movement of said compartment to reduce the velocity thereof to zero.

References Cited by the Examiner

UNITED STATES PATENTS 1,141,248  6/15  Kadlec _____ 296—35

FOREIGN PATENTS 705,020  3/31  France.

A. HARRY LEVY, *Primary Examiner.*

PHILIP ARNOLD, *Examiner.*